(12) United States Patent
Salcedo et al.

(10) Patent No.: US 6,774,942 B1
(45) Date of Patent: Aug. 10, 2004

(54) BLACK LEVEL OFFSET CALIBRATION SYSTEM FOR CCD IMAGE DIGITIZER

(75) Inventors: Jose A. Salcedo, Livermore, CA (US); Srinivas N. Neti, San Jose, CA (US); Charles A. Rogers, San Jose, CA (US)

(73) Assignee: Exar Corporation, Fremont, CA (US)

( * ) Notice: Subject to any disclaimer, the term of this patent is extended or adjusted under 35 U.S.C. 154(b) by 796 days.

(21) Appl. No.: 09/642,613

(22) Filed: Aug. 17, 2000

(51) Int. Cl.[7] ............................. H04N 9/64; H04N 5/16
(52) U.S. Cl. ..................................... 348/243; 348/257
(58) Field of Search .............. 348/207.99, 220.1–222.1, 348/229.1, 230.1, 241, 243, 250, 294–296, 607, 615, 618, 619, 622, 257, 254, 255; 358/463, 465, 466; 382/270, 272, 274, 275

(56) References Cited

U.S. PATENT DOCUMENTS

| | | | |
|---|---|---|---|
| 3,737,571 A | * | 6/1973 | Gaebele et al. ............. 348/243 |
| 4,468,704 A | * | 8/1984 | Stoffel et al. ............... 358/464 |
| 4,903,144 A | | 2/1990 | Stefanik et al. ............. 358/461 |
| 5,105,276 A | | 4/1992 | Schrock ...................... 348/241 |
| 5,111,311 A | | 5/1992 | Yamamoto ................... 358/461 |
| 5,121,119 A | | 6/1992 | Higuchi et al. ............. 341/120 |
| 5,303,064 A | * | 4/1994 | Johnson et al. ............. 358/406 |
| 5,408,335 A | | 4/1995 | Takahashi et al. .......... 358/443 |
| 5,448,306 A | | 9/1995 | Koyama ..................... 348/678 |
| 5,548,331 A | * | 8/1996 | Kawahara et al. .......... 348/243 |
| 5,659,355 A | * | 8/1997 | Barron et al. ............... 348/245 |
| 6,049,355 A | * | 4/2000 | Kameyama ................. 348/241 |
| 6,157,407 A | * | 12/2000 | Kobayashi ................... 348/241 |
| 2002/0012053 A1 | * | 1/2002 | Yoshida ...................... 348/243 |

* cited by examiner

*Primary Examiner*—Ngoc-Yen Vu
(74) *Attorney, Agent, or Firm*—Townsend and Townsend and Crew LLP

(57) ABSTRACT

An improved offset correction circuit for an image digitizing system having a correlated double sample and hold circuit, a programmable gain amplifier and an analog-to-digital converter. The output of the analog-to-digital converter is provided to a dual offset correction circuit. The dual offset correction circuit provides both first and second correction values as feedback signals. In one embodiment, the first correction value is a coarse correction which is applied prior to amplification by the programmable gain amplifier. The second correction value is a fine correction offset which is applied as feedback after the programmable gain amplifier.

10 Claims, 2 Drawing Sheets

BLACK LEVEL OFFSET CALIBRATION SYSTEM FOR CCD IMAGE DIGITIZER

BACKGROUND OF THE INVENTION

The present invention relates to offset calibration systems for image sensor digitizers, and in particular to black level offset for CCD sensors.

CCD image sensors are used in both motion and still image acquisition applications, such as video camcorders, image scanners and digital still cameras. To get improved image quality, any offset in the black level of the CCD output signal must be corrected.

In U.S. Pat. No. 4,903,144, Stefanik et al. teaches a method which combines digitized data from a reference image and digitized data from the CCD's optical black (OB) pixels (OB pixels are covered so they receive no light), to generate an offset correction signal. The requirement of a reference image adds to the complexity and cost of the system and requires a special calibration time separate from the active image acquisition time.

In U.S. Pat. No. 5,408,335, Takahashi et al. teaches various servo control loop methods of comparing digitized data from the CCD's optical black (OB) pixels to a reference value, and then generating a correction signal which is summed with the CCD image signal. These methods may cause undesirable image artifacts if there is noise in the OB pixels. Also, these methods require high resolution digital-to-analog converters (DACs) to create the correction signal, because the correction signal is added to the CCD signal before amplification.

Other patents relating to black level offset include U.S. Pat. No. 5,105,276, DC Restoration of Sampled Imagery Signals; U.S. Pat. No. 5,111,311, Image Reading Apparatus with Black Level Correction; U.S. Pat. No. 5,121,119, Analog-to-Digital Conversion Method and System with Correction of Analog Gain and Offset; U.S. Pat. No. 5,448,306, Image Processing Apparatus with Variable Clamping; and U.S. Pat. No. 5,659,355, CCD Dark Mean Level Correction Circuit Employing Digital Processing and Analog Subtraction Requiring No Advanced Knowledge of Dark Means Level.

SUMMARY OF THE INVENTION

The present invention provides an improved offset correction circuit for an image digitizing system having a correlated double sample and hold circuit, a programmable gain amplifier and an analog-to-digital converter. The output of the analog-to-digital converter is provided to a dual offset correction circuit. The dual offset correction circuit provides both first and second correction values as feedback signals.

In one embodiment, the first correction value is a coarse correction which is applied prior to amplification by the programmable gain amplifier. The second correction value is a fine correction offset which is applied as feedback after the programmable gain amplifier.

In one embodiment, the present invention also provides a clipping circuit which limits an input value to the offset correction circuit to a predetermined threshold. This threshold is set to a maximum amount to be expected from an optical black pixel. This thus limits the effective magnitude of any hot pixel in the optical black area. The use of a clipping circuit has been found by the inventors to be simpler and just as effective as identifying and eliminating hot pixels in the optical black area.

In another embodiment of the invention, the offset correction circuit includes an averaging circuit. The averaging circuit computes the average values of data corresponding to optical black pixels. The averaging circuit filters any noise from the digitized optical black pixel values.

In another embodiment of the invention, the offset correction circuit includes a comparison circuit. The comparison circuit compares a measured error value to a reference value. An offset correction is generated only if the reference value is met or exceeded. Such a comparison to a threshold ensures that the system will converge and remain stable, and suppresses the effects of noise.

For a further understanding of the nature and advantages of the invention, reference should be made to the following description taken in conjunction with the accompanying drawings.

DESCRIPTION OF THE SPECIFIC EMBODIMENTS

An object of the present invention is to provide an automatic and stable, black level offset calibration system for a CCD image digitizing device. The system is suitable for a variety of digital video camera and digital still camera applications. The system does not introduce any undesirable image artifacts, it is reliable, and it is adaptable to specific application needs.

Figure 1:
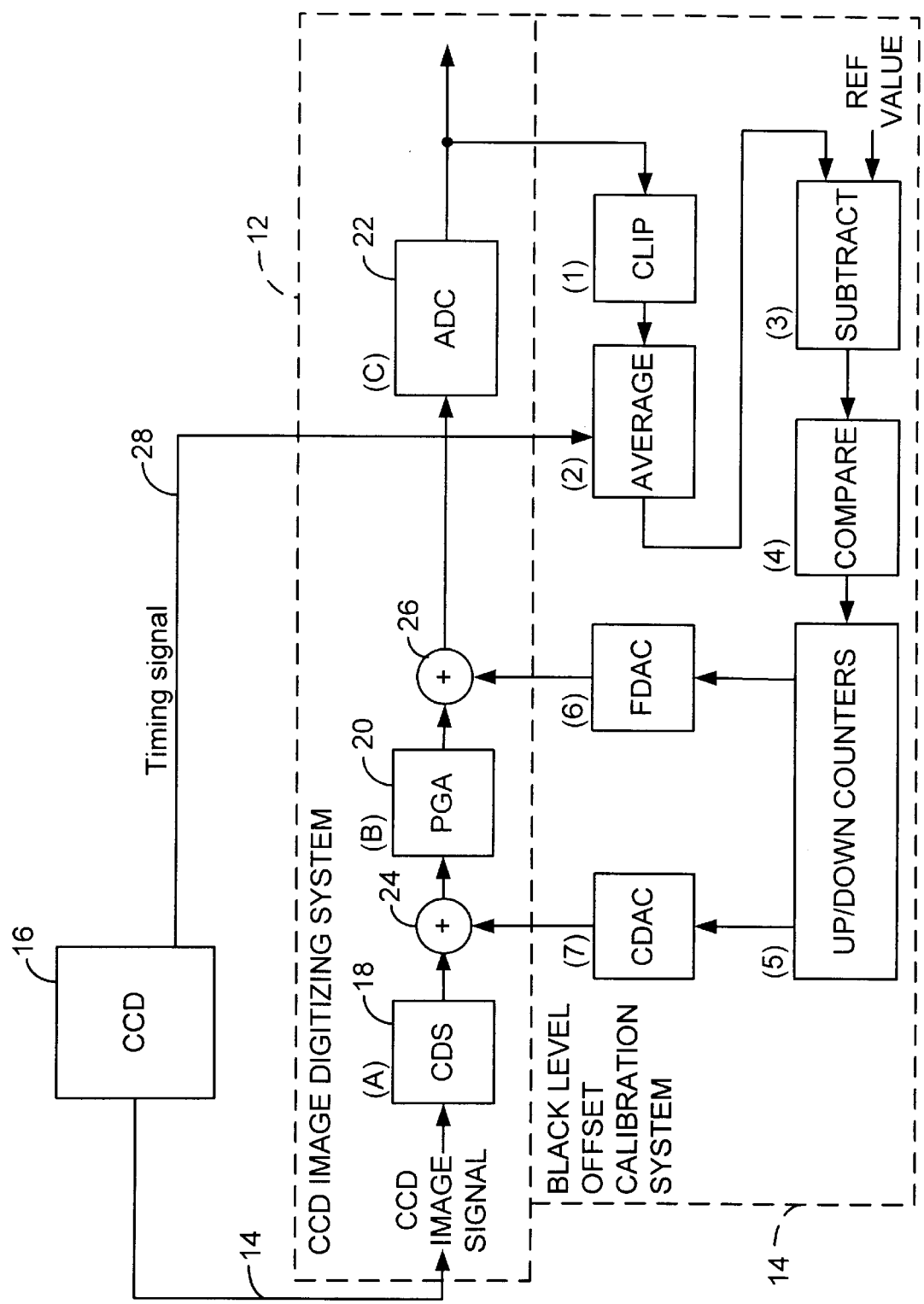
FIG. 1 is a block diagram of a CCD image digitizing system with an offset generation circuit according to an embodiment of the invention.

FIG. 1 shows a typical CCD image digitizing system 12. An analog image signal is provided on line 14 from CCD sensor 16 to correlated double sample and hold (CDS) 18. CDS 18 samples the CCD image signal and extracts the voltage which is proportional to the amount of light which fell on each pixel. Programmable gain amplifier (PGA) 20 amplifies the voltage to the proper range for ADC 22. Analog-to-digital converter (ADC) 22 converts the voltage to a digital code suitable for further digital signal processing.

The present invention adds black level offset calibration system 14 and summing circuits 24 and 26. The components of the black level offset calibration system 14 include:

1. Clipping circuit, to limit the magnitude of the ADC output code.
2. Averaging circuit to calculate the average of the ADC output codes for the OB pixels.
3. Subtraction circuit, to calculate the error which is the difference between the calculated average and a reference value.
4. Comparison circuit, to determine the magnitude of the calculated difference and decide on the proper course of action for the up/down counters.
5. Up/down counters, to hold and adjust the digital offset correction codes for the DACs.
6. Fine offset digital-to-analog converters (FDAC), to convert the fine offset correction code to an analog offset correction signal.
7. Coarse offset digital-to-analog converters (CDAC), to convert the coarse offset correction code to an analog offset correction signal.

Clipping Circuit (1)

One of the potential defects of a CCD is pixels which are stuck on or partially on. These are called "hot pixels", because in an image they will appear to be illuminated. Image processing software can detect and correct hot pixels in an image, but when hot pixels occur in the OB area it can cause problems in the black level offset which cause streaks in the final image.

Figure 2:
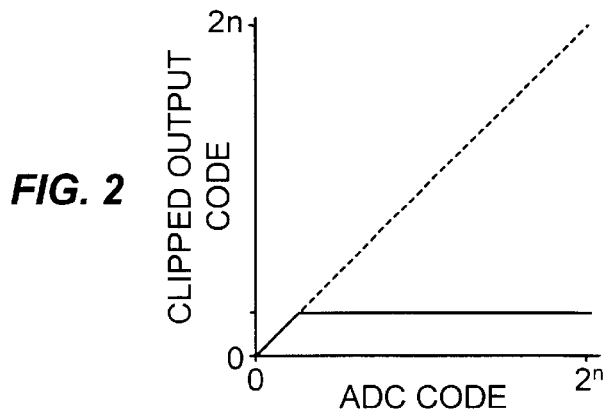
FIG. 2 is a graph illustrating the clipping output of the clipping circuit of FIG. 1.

The clipping circuit is used to reduce the effects of hot pixels. FIG. 2 is a chart showing the function implemented by the clipping circuit. The clipping circuit can be described by the following function:

if (input code<threshold), then output code=input code else output code=threshold The threshold value must be larger than the sum of the reference value used in the subtraction circuit (3) and the "big" threshold used in the comparison circuit (4). It should not be so large that it doesn't clip.

This limits the effective magnitude of any hot pixel in the OB area to the threshold value. The threshold can be set low enough such that the remainder of the calibration algorithm will function properly, and no streaks will appear in the final image. We evaluated other methods of actually detecting and discarding hot pixels which occur in the OB area. These methods worked just as effectively as our simple clipping circuit, but they also added significantly to the size and complexity of the circuitry.

Averaging Circuit (2)

The calibration system needs to measure the digitized values of the OB pixels in order to generate the appropriate offset correction signal. The purpose of the averaging circuit is to filter any noise from the digitized OB pixel values.

First, the averaging circuit needs to determine which ADC output codes represent OB pixel values. This is accomplished by reading a signal from the CCD timing generator on line 28 which frames the OB pixels, and adjusting this signal for the pipeline delay of the CDS/PGA/ADC.

Next, the average of the OB pixels is calculated. The number of pixels to be arranged can be a fixed value, or it can be a programmable parameter.

Subtraction Circuit (3)

This circuit takes the result of the average circuit, subtracts from it a reference value, and outputs the difference. The reference value is the desired ADC output code to represent black pixels. The reference value can be a fixed code or it can be a programmable parameter.

Comparison Circuit (4)

This circuit reads the difference output from the subtraction circuit, and generates control signals for the up/down counters. The goal is to adjust the counters such that the difference goes to zero.

Figure 3:
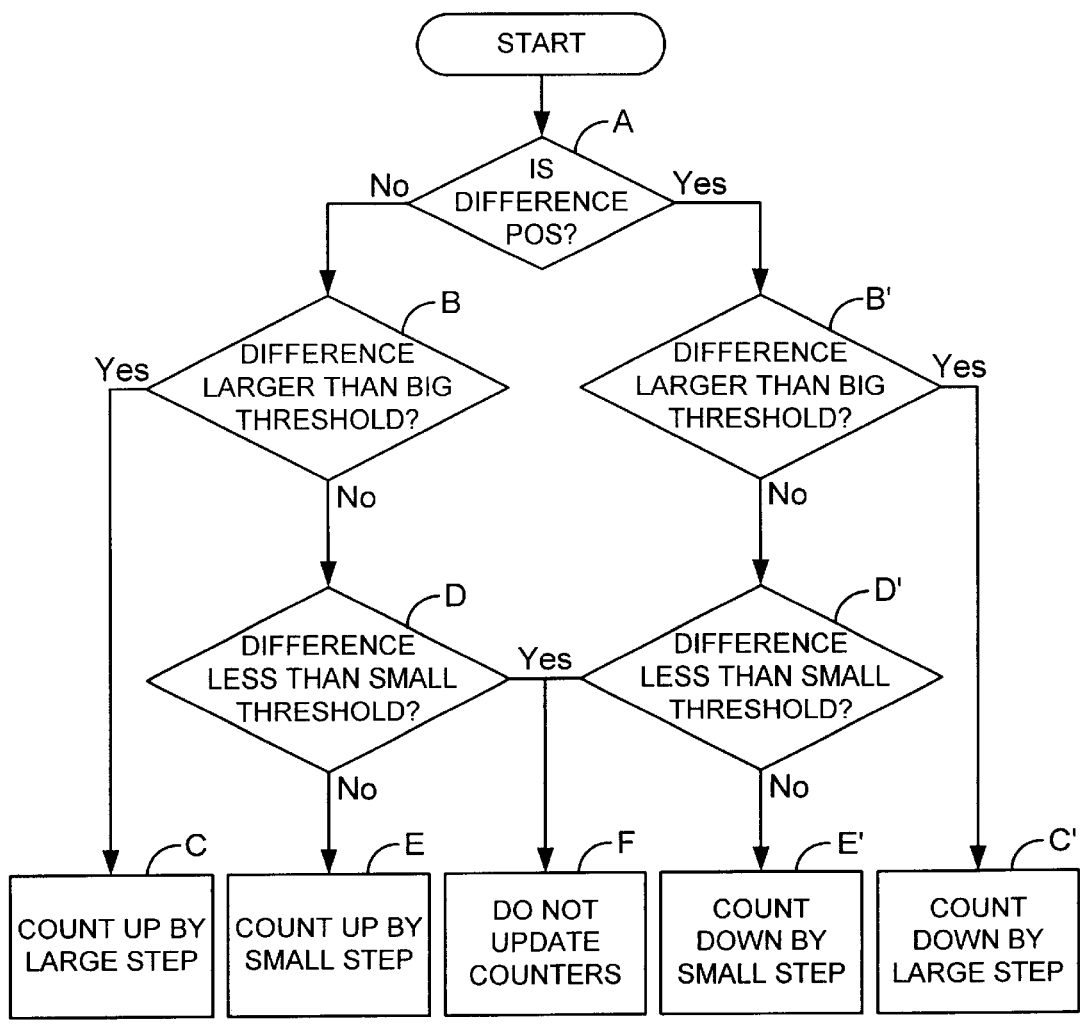
FIG. 3 is flowchart illustrating one embodiment of the operation of the comparison circuit of FIG. 1.

There are many valid ways to generate the control signals from the difference. FIG. 3 shows a flowchart describing one method which achieves the desired goals while keeping circuit size and complexity low.

In the first step (A), the sign of the difference is used to determine if the counters need to count up or down. If the difference is positive, the counters must count down to reduce the offset. If the difference is negative, the counters must count up to increase the offset. The negative portion of the flowchart is described below with letters corresponding to the steps, while letters with an apostrophe indicate corresponding steps for the positive portion.

In the second step (B), the magnitude of the difference is compared to a "big" threshold. If the difference is larger than the "big" threshold then we know there is still a large offset error, and the counters are instructed to make a large increment or decrement step (C). This is done to reduce the amount of time required for the loop to converge on the proper correction codes for the DACs. The "big" threshold can be a fixed value, or a programmable parameter.

If the difference was not larger than the "big" threshold, then the difference is compared to a "small" threshold (D). If the difference is larger than the "small" threshold (i.e. it is between the "big" and "small" thresholds), then we know there is a small to medium offset error, and the counters are instructed to make a small increment or decrement step (E). If the difference is less than the "small" threshold, then we know the remaining offset error is small or zero, and the counters are instructed to make no increment or decrement (F). By setting a threshold below which the circuit makes no changes we guarantee the system will converge and then remain stable, suppressing the effects of noise. The "small" threshold can be a fixed value, or a programmable parameter.

Up/Down Counters (5)

There are two counters, one for the coarse DAC (CDAC), and one for the fine DAC (FDAC). The counters hold the digital codes for each DAC. The codes are incremented or decremented based on the control signals from the comparison circuit.

A small step is accomplished by adding or subtracting one count to the FDAC code. Special logic is used to detect when the FDAC counter overflows or underflows. In either of these special conditions, the FDAC counter is reset, and the CDAC counter must be incremented or decremented appropriately.

A large step is accomplished by adding or subtracting a value to the CDAC code. This large step value depends on the setting of the PGA. To guarantee a stable feedback loop, the large step of the CDAC must result in an ADC code change no larger than the "big" threshold. The CDAC offset correction signal is added to the image signal and the result is amplified by the PGA. Therefore, the maximum large step value is the "big" threshold divided by the PGA gain.

Fine and Coarse Offset Digital-to-Analog Converters (6 and 7)

These DACs convert the digital offset correction codes into the analog signals which are added to the image signal. The trend in CMOS is for lower power supply voltages (due to reducing transistor geometry). This limits the maximum allowed signal amplitudes. Canceling offset early in the signal processing is critical for maintaining maximum dynamic range.

The CDAC (coarse offset DAC) output is added to the image signal before amplification by the PGA. Depending on the circuit architecture used for the CDS and PGA, the CDAC output may be either a voltage or a current. The full scale range of the CDAC determines the maximum amount of offset the system can correct.

The FDAC (fine offset DAC) output is added after the image signal has been amplified by the PGA. This allows the system to make very small and gradual adjustments to the black level offset, so no image artifacts are introduced.

Prior art has shown the use of a single offset correction applied post-PGA. This places a severe limitation on the maximum dynamic range of the CCD digitizing system because the offset is gained up by the PGA along with the image signal. This also has a limited amount of input referred offset it can correct.

Prior art has also shown the use of a single offset correction applied pre-PGA. This allows for much better dynamic range of the CCD digitizing system. But high PGA gains will require a very high resolution DAC to generate a correction signal which produces small and gradual offset changes at the ADC input.

The use of dual offset correction signals, applied pre and post PGA, requires medium resolution DACs and provides increased dynamic range, wide input referred correction range and smooth gradual adjustments without image artifacts.

As will be understood by those of skill in the art, the present invention may be embodied in other specific forms without departing from the essential characteristics thereof. For example, a CMOS sensor could be used instead of a CCD sensor. In addition, different combinations of the novel aspects of the invention could be used. For example, the dual offset correction could be provided without the clipping, averaging or comparison to big and small thresholds. Alternately, any combination or sub-combination of these features could be used in a particular embodiment. For example, the clipping and averaging could be used for a single offset system. Accordingly, the foregoing description is intended to be illustrative, but not limiting, of the scope of the invention which is set forth in the following claims.

What is claimed is:

1. An image digitizing system comprising:
   a correlated double sample and hold circuit;
   a first combining circuit coupled to an output of said correlated double sample and hold circuit;
   a programmable gain amplifier coupled to an output of said first combining circuit;
   a second combining circuit coupled to an output of said programmable gain amplifier;
   an analog to digital converter coupled to an output of said second combining circuit; and
   a dual offset correction circuit, having an input coupled to an output of said analog to digital converter, a first output coupled to said first combining circuit, and a second output coupled to said second combining circuit, and configured to provide a first correction value to said first combining circuit and a second correction value to said second combining circuit.

2. The system of claim 1 wherein said first correction value provides a coarse correction amount, and said second correction provides a fine correction amount, said fine correction being smaller than said coarse correction.

3. The system of claim 1 wherein said dual offset correction circuit further comprises:
   a clipping circuit, coupled to said input of said dual offset correction circuit, configured to limit an input value to a predetermined threshold.

4. The system of claim 3 wherein said threshold is programmable.

5. The system of claim 1 wherein said dual offset correction circuit further comprises:
   an averaging circuit configured to compute an average of the values of data corresponding to optical black pixels.

6. The system of claim 5 wherein said averaging circuit includes a sensor timing input for use in identifying optical black pixels.

7. The system of claim 1 wherein said dual offset correction circuit further comprises:
   a measurement circuit for determining a measured error; and
   a comparison circuit for comparing said measure error to a reference value; and
   an offset generation circuit for generating new first or second correction values only if said reference value is met or exceeded.

8. The system of claim 7 wherein said offset generation circuit comprises:
   first and second up/down counters;
   a coarse digital to analog converter coupled to an output of said first up/down counter; and
   a fine digital to analog converter coupled to an output of said second up/down counter.

9. An image digitizing system comprising:
   a correlated double sample and hold circuit;
   a first combining circuit coupled to an output of said correlated double sample and hold circuit;
   a programmable gain amplifier coupled to an output of said first combining circuit;
   a second combining circuit coupled to an output of said programmable gain amplifier;
   an analog to digital converter coupled to an output of said second combining circuit; and
   a dual offset correction circuit, having an input coupled to an output of said analog to digital converter, a first output coupled to said first combining circuit, and a second output coupled to said second combining circuit, and configured to provide a first correction value to said first combining circuit and a second correction value to said second combining circuit, wherein said first correction value provides a coarse correction amount, and said second correction provides a fine correction amount, said fine correction being smaller than said coarse correction, said dual offset correction circuit including
   a clipping circuit, coupled to said input of said dual offset correction circuit, configured to limit an input value to a predetermined threshold,
   an averaging circuit configured to compute an average of the values of data corresponding to optical black pixels,
   a measurement circuit for determining a measured error,
   a comparison circuit for comparing said measure error to a reference value, and
   an offset generation circuit for generating new first or second correction values only if said reference value is met or exceeded.

10. An image digitizing system comprising:
    a correlated double sample and hold circuit;
    a programmable gain amplifier coupled to an output of said correlated double sample and hold circuit;
    an analog to digital converter coupled to an output of said programmable gain amplifier; and
    an offset correction circuit, having an input coupled to an output of said analog to digital converter, said offset correction circuit including a measurement circuit for determining a measured error, a comparison circuit for comparing said measure error to a reference value, and an offset generation circuit for generating new first or second correction values only if said reference value is met or exceeded, wherein said comparison circuit provides comparisons to both a big and a small threshold, generating a coarse correction output if said big threshold is met or exceeded, and generating a fine correction output if said small threshold is exceeded wherein said offset generation circuit comprises:

first and second up/down counters;

a coarse digital to analog converter coupled to an output of said first up/down counter; and a fine digital to analog converter coupled to an output of said second up/down counter.

\* \* \* \* \*